M. J. MUNN.
OIL STORAGE TANK.
APPLICATION FILED DEC. 21, 1915.
1,200,391.
Patented Oct. 3, 1916.
3 SHEETS—SHEET 2.
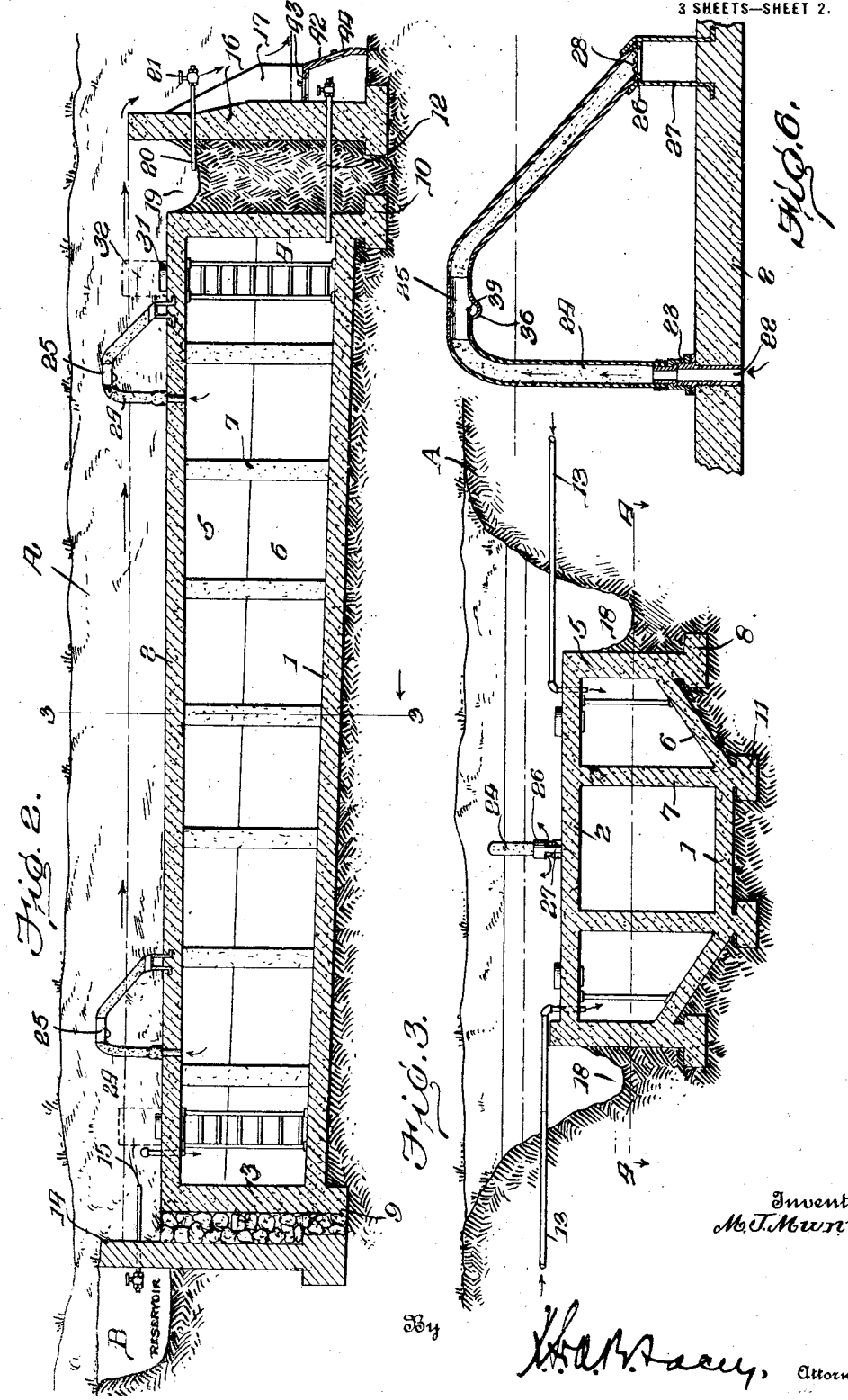
Inventor
M. J. Munn.
By
Attorneys.

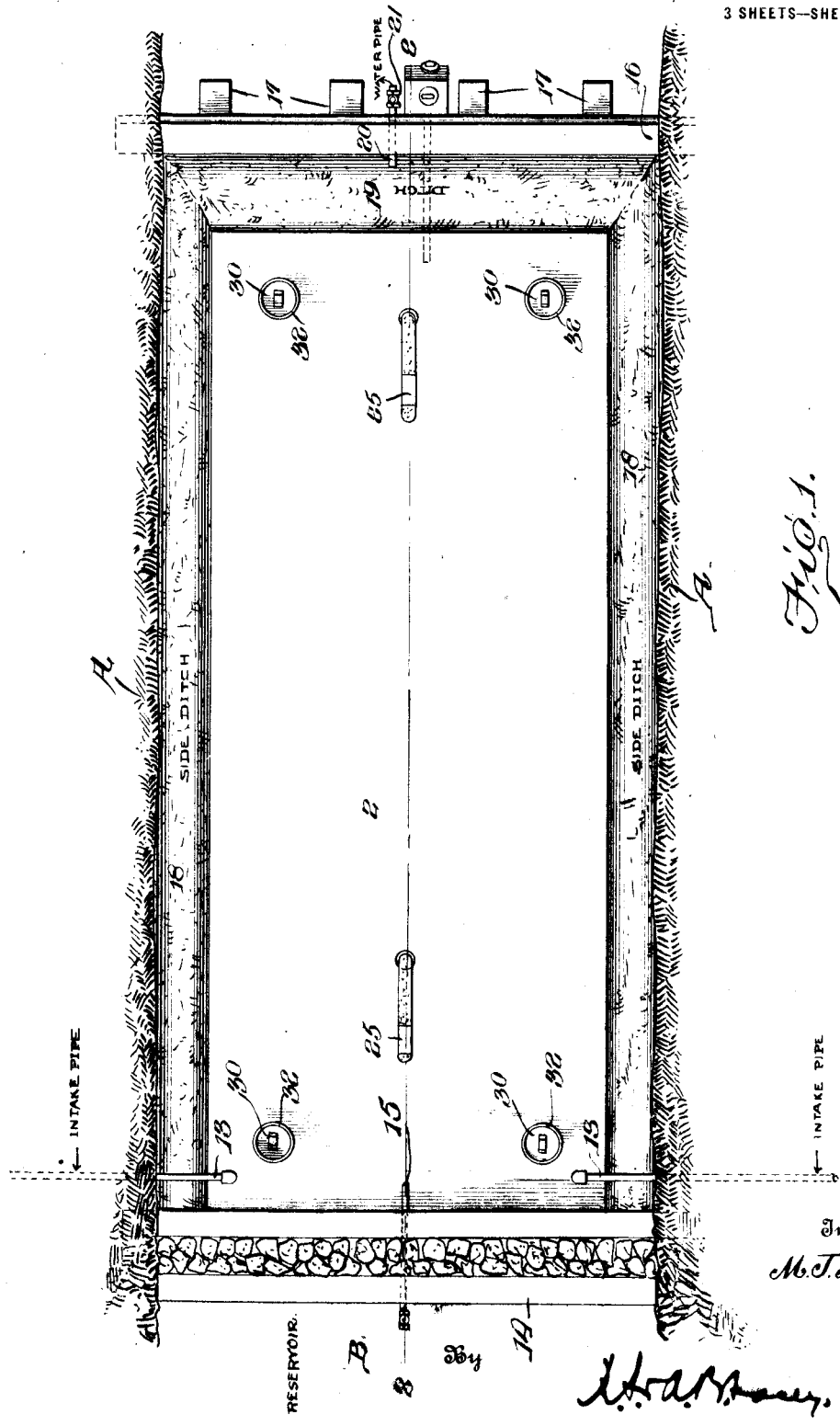

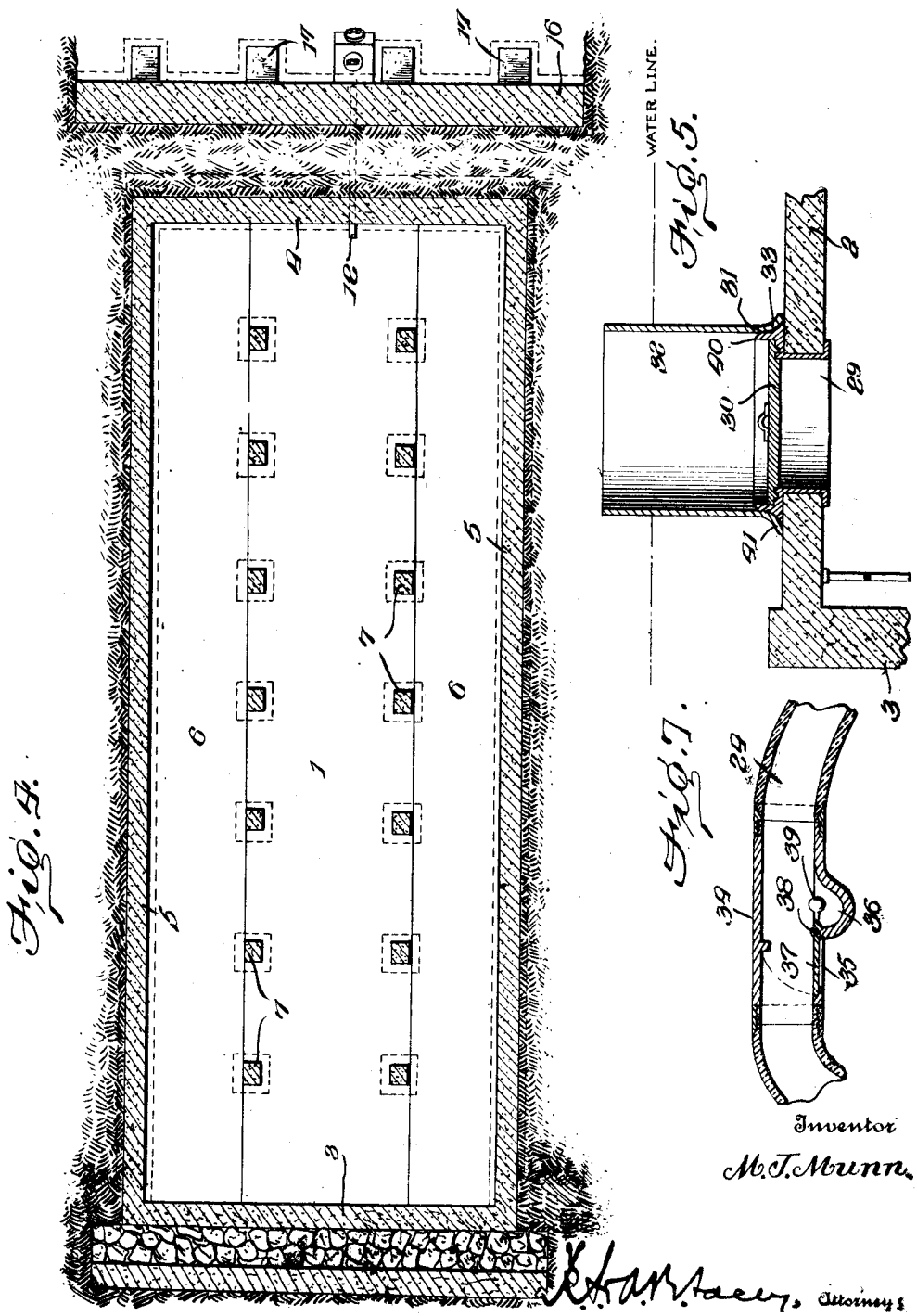

UNITED STATES PATENT OFFICE.

MALCOLM J. MUNN, OF TULSA, OKLAHOMA, ASSIGNOR TO CONCRETE OIL STORAGE COMPANY, OF TULSA, OKLAHOMA.

OIL-STORAGE TANK.

1,200,391.          Specification of Letters Patent.          Patented Oct. 3, 1916.

Application filed December 21, 1915. Serial No. 68,037.

*To all whom it may concern:*

Be it known that I, MALCOLM J. MUNN, a citizen of the United States, residing at Tulsa, in the county of Tulsa and State of Oklahoma, have invented certain new and useful Improvements in Oil-Storage Tanks, of which the following is a specification.

This invention relates to crude oil storage tanks and has as its object to provide a crude oil storage tank so constructed and arranged that there will be no likelihood of destruction of the tank or loss of oil through fire or lightning and but little loss of oil through evaporation.

It is an object of the invention to so construct and arrange the tank that the entire tank will be insulated in such a manner that no portion thereof which is a conductor of electricity will be so exposed as to be likely to be struck by lightning and yet provide for the introduction of oil into the tank, for the drawing off of the oil whenever desired, and for the escape of gases rising from the oil and for access to the tank for the purpose of cleaning or repairing the interior thereof.

It has been ascertained by experience that in tanks of this nature damage caused by lightning is incident to the gases arising from the oil in the tank being ignited and therefore the invention contemplates the provision of means whereby such gases may be permitted to escape to the atmosphere from an insulated and water-sealed outlet or vent so that even should such gases be ignited by lightning or through the agency of fire the contents of the tank will remain intact.

In its broad aspect the invention contemplates the utilization of a natural catchment or stream or a specially constructed dam arrangement for wholly submerging the tank for the purpose above stated and not only does the body of water and moist soil which completely surrounds the tank serve to insulate the tank and protect the same both from lightning and fire, but this particular arrangement of the tank results in the further advantage that the oil within the tank is maintained at a substantially constant minimum temperature and therefore there is not likely to be any undue loss of oil through evaporation. Furthermore, as the invention contemplates the construction of the tank from concrete or other porous material, there is secured the further advantage that the walls of the tank being of porous material and being water saturated, resistance is offered to passage of the oil by capillary attraction through the said walls.

Another aim of the invention is to provide means whereby access may be had to the interior of the tank without the necessity of draining off the body of water in which the tank is submerged.

In the accompanying drawings, Figure 1 is a top plan view of the tank embodying the invention, the view illustrating the manner in which the tank is to be arranged with respect to a reservoir and spill-way; Fig. 2 is a vertical longitudinal sectional view on the line 2—2 of Fig. 1; Fig. 3 is a vertical transverse sectional view on the line 3—3 of Fig. 2; Fig. 4 is a horizontal sectional view through the tank; Fig. 5 is a detail vertical sectional view illustrating the means provided whereby access may be had to the interior of the tank; Fig. 6 is a detail vertical sectional view through the gas outlet or vent. Fig. 7 is a detail longitudinal sectional view illustrating the vent valve arranged within the vent pipe.

Corresponding and like parts are referred to in the following description and indicated in all the views of the drawings, by the same reference characters.

While the accompanying drawings illustrate a certain specific construction of tank and a certain arrangement of the same with relation to a natural or artificial reservoir and spill-way, it is to be understood that the drawings are to be considered merely as illustrating one embodiment and arrangement of the invention and that the details of construction and arrangement may be modified in many ways without departing from the principle involved.

The tank in itself may be constructed from any suitable material, such for example as concrete, stone, wood or, in fact, may be of any construction so long as its walls are of some material which is more or less porous or permeable and in the illustrated embodiment of the invention the bottom or floor of the tank is indicated by the numeral 1, the top or roof by the numeral 2, one end wall being indicated by the numeral 3 and the other by the numeral 4.

The numeral 5 indicates in general the side walls of the tank and the numeral 6 indicates walls which incline downwardly and inwardly from the lower portions of the side walls 5 to the bottom or floor 1 of the tank, as clearly shown in Fig. 3 of the drawings. For convenience in describing the tank the walls 6 thereof may be considered as a portion of the bottom of the tank, the wall indicated by the numeral 1 being the true bottom or floor. Uprights 7 within the tank serve to brace the top of the tank with relation to the floor and these uprights are preferably arranged in two series upstanding from the floor 1 near the lower side of the inclined bottom walls 6 although some other arrangement may be found desirable. The side walls 5 of the tank are provided with footings 8 which add to the stability of these walls and in a like manner the end walls 3 and 4 are provided respectively with footings 9 and 10 and the floor 1 is provided with footings 11 located at points below the lower ends of the uprights 7. By reference to Fig. 2 of the drawings it will be observed that the bottom of the tank is inclined downwardly from the end wall 3 thereof to the end wall 4 and in order that all of the oil and any sediment therein may be drawn off from the tank there is provided an oil outlet pipe 12 which extends through the end wall 4 of the tank close to the floor 1 and this pipe may lead to any convenient point for discharge and be provided with any suitable valve to control such discharge. In order that oil may be introduced into the tank one or more inlet pipes, indicated by the numeral 13, are provided and these pipes lead into the tank through the top or roof 2 thereof.

As before stated the tank may be constructed or arranged in the beds and sides of natural valleys or gorges and a natural catchment or an artificial reservoir may be utilized in maintaining a body of water above the tank or a specially constructed reservoir and bed for the tank may be employed for the purpose above stated. In the embodiment illustrated in the drawings the tank is arranged in the bed of a stream, the banks of which are indicated at A and the reference letter B indicates a natural catchment or reservoir or a specially dug or constructed one which is located upstream with relation to the tank. A dam wall 14 is constructed in spaced relation to the wall 3 of the tank and the space between the said walls is preferably filled in with crushed rock. In order that water may flow from the reservoir past the wall 14 a pipe 15 is arranged to extend through the said wall and at a point above the plane of the roof of the tank. In order that water flowing from the reservoir over the roof of the tank may be dammed and therefore maintained at a proper and described level so as to insure of insulation of the tank at all times, there is provided, a suitable distance down stream with relation to the wall 4 of the tank, a dam wall, indicated by the numeral 16, this wall being preferably reinforced by buttresses 17 and having its upper portion located a suitable distance above the plane of the roof of the tank, as clearly shown in Fig. 2 of the drawings. For a purpose to be presently explained the bed of the stream is dug to form ditches 18 extending along the sides of the tank and communicating with a ditch 19 extending transversely of the upper portion of the lower end wall 4 of the tank, the ditch 19 being, of course, located between the said end wall 4 and the dam wall 16. It will now be understood that water flowing from the reservoir B will accumulate within the ditches 18 and 19 and above the tank until it reaches the level of the upper portion of the wall 16 and that it may be maintained at this level so as to completely cover and submerge the tank. In the event that it is desired to drain off the water for the purpose of repairing the tank or deepening the ditches 18 and 19, an overflow pipe 20 is arranged within the said wall 16 and is provided with a suitable cut-off valve 21 or this overflow may be provided for in any suitable and well known manner. It will now be understood that the body of water above the tank will not only fill the ditches 18 and 19 but will seep through the soil in which the sides and bottom of the tank are embedded and this soil being in this manner moistened, the side and bottom walls of the tank will be kept moist or saturated with water and as the water has a greater tendency to pass through the pores of the walls than has the oil, the passage of the oil by capillary attraction through the walls will be effectually resisted and loss of oil will be prevented.

While in the illustrated embodiment of the invention the lower portion of the tank is surrounded by moist soil it will be understood that the tank may be so arranged within the bed of the stream that the water in which it is submerged will come in direct contact with substantially all portions of its walls and bottom.

In order that gases rising from the oil contained in the tank may escape to the atmosphere without the usual danger of ignition from lightning or fire in, such manner as to result in destruction of the tank or ignition of the oil within the tank, one or any desired number of vents, preferably of the construction illustrated in Fig. 6 of the drawings, are employed in connection with the tank. In the construction illustrated, a pipe 22 is arranged within the roof of the tank and is connected by a threaded nipple 23 or by any other suitable type of water proof connection, with one end of a suitable length of rubber hose 24 which extends upwardly from the connection 23 and is thence bent over as at 25 in such manner that its bend will extend above the normal water level which is indicated by dot and dash lines in the several figures of the drawings, the lower or discharge end of the hose or tubing being fitted and secured within a collar 26 supported by suitable uprights 27 embedded in or otherwise fixed to the roof of the tank. By reference to Figs. 2, 3 and 6 of the drawings, it will be observed that the discharge end of the hose 24 is in this manner supported and held below the water level but spaced above the plane of the roof 2, the said discharge end having fitted to it a foraminous disk or screen 28. While it is preferable that the hose 24 be of rubber or of some other material which is a non-conductor of electricity the said tube may be of metal and may be suitably insulated from the tank and from the supporting collar 26 or an equivalent supporting means.

It will now be understood that by reason of the construction above described a vent for gases rising from the oil within the tank is provided and yet this vent is so constructed and arranged that it will not be likely to be struck by lightning nor could damage result from fire in the vicinity of the tank owing to the provision of a water sealed vent for the gases. It will also be apparent that gases escaping through the outlet end of the pipe 24 must rise through the body of water above the tank a distance nearly equal to the depth of the water above the roof 2 and that due to the water seal provided, the gases must be under some little pressure in order to escape from the said vent passage. Thus not only does the particular vent arrangement herein illustrated and described provide for a safe escape of gases from the tank but it also prevents to a considerable extent loss of oil through evaporation due to the resistance offered to the escape of the gas.

In order that access may be had to the interior of the tank for the purpose of cleaning or repairing the same, one or any desired number of man-holes are provided in the top of the tank, and in the drawings the numeral 29 indicates the casing of the man-hole and 30 the cover therefor, the cover being fitted in any well known manner so as to be air and water tight and thereby prevent not only the escape of gas from the tank but also the entrance, into the tank, of water. The casing 29 is provided with an upstanding annular flange 31 which is exteriorly threaded and by references to Figs. 2 and 3 of the drawings it will be observed that this casing and its flange projects but a very short distance above the plane of the roof 2 and is consequently submerged and therefore no portion of the casing is exposed above the water level. In order that the tank may be entered, however, there is provided a supplemental casing which is indicated by the numeral 32 and comprises a hollow cylindrical open-ended body interiorly threaded as at 33 at its lower end. In employing the supplemental casing 32 the lower portion of the same is submerged in the body of water above the tank and threaded onto the flange 31 in the manner shown in Fig. 9 of the drawings. By reference to Fig. 9 it will be observed that the supplemental casing is of such height that when so connected with the casing 29 its upper end will project above the water level and consequently after the water within the casing 32 has been bailed or pumped out or otherwise removed, the man-hole cover 30 may be removed and entrance to the tank may then be had through the casing 32 and casing 29. In connection with this portion of the structure it will be seen that while access may be readily had to the interior of the tank, nevertheless there is ordinarily no portion of the structure projecting above the water surface by which such access may be had.

It will be understood of course that the inlet and outlet pipes may be insulated from the walls of the tank through which they enter in any suitable manner. It will also be understood that the invention contemplates the utilization of any available natural ground formations in the construction and arrangement of the tank so that the same will be insulated in the manner heretofore explained. It will further be understood that the vent hose 24 need not necessarily assume the exact shape or curvature herein shown but may be arranged in any other suitable manner.

Inasmuch as when oil is being drawn from the tank a partial vacuum will be created it is necessary that means be provided for admitting air to the tank so that the drawing off of the oil will not be interfered with and so that there will be no likelihood of the water in which the tank is submerged being drawn by suction into the gas vent pipes and this means is clearly illustrated in Figs. 6 and 7 of the drawings. In the upper portion or bend of each of the vent pipes 24 there is interposed a valve casing indicated by the numeral 34 and provided in its under side with an opening 35 and adjacent the opening with a downward bulge indicated at 36. A valve 37 is fitted as at 38 within the casing 34 and has a weighted end 39 designed to be accommodated within the bulge 36 when the valve swings upwardly as indicated in dotted lines in Fig. 7. The valve 37 normally rests by gravity upon its seat and closes the opening 35, but when oil is being drawn from the tank and a partial vacuum is created within the tank and within the vent pipe 26, the valve will open so as to admit air to the said pipe and will, of course, again close as soon as equilibrium in pressure is obtained.

In order that the casing 32 may be readily and conveniently fitted to the flange 31 of the casing 29, the upper edge of this flange is exteriorly beveled as indicated at 40 and the lower end portion of the casing 32 is flared as indicated at 41.

To protect the outlet from the tank the valved outer end of the pipe 12 is housed within a casing 42 provided in its top with a manhole cover 43 and with a similar cover 44 in its outer side.

By locating the tank in small steep-sided valleys or in large ravines, the cost of excavation is to a large degree avoided and, furthermore, it is possible to obtain a supply of water at little or no cost.

Having thus described the invention, what is claimed as new is:—

1. An oil reservoir comprising a concrete tank anchored in the bottom of a stream, the top of the tank being below the level of the water in the stream, means for drawing oil from the tank, and means for supplying oil to the tank, and a vent pipe insulated from said tank and extending beyond the level of the water, the portion of the vent pipe above the water having a valve opened by the formation of a partial vacuum formed in the tank when oil is withdrawn, for the admission of air to said tank.

2. The combination with an oil storage tank submerged in water, means insulated from the tank for venting same, means for supplying oil to the tank, and a draw off pipe at the bottom of the tank.

3. The combination of a storage tank constructed of concrete and embedded in earth, of a wall spaced from each opposite end of the tank, the walls and the adjacent banks maintaining a body of water over the top of the tank to insulate the latter against fire, means extending beyond the water to vent the tank, means for supplying oil to the tank, a draw off pipe at the bottom of the tank, and man hole casings extending through the body of water and insulated from the tank.

4. A concrete oil storage tank having its bottom longitudinally and partially transversely inclined, supporting posts extending from the juncture of the two inclined portions of the bottom to the top, anchors at the bottom of the tank, said tank being embedded in the earth and having a body of water extending over the entire top, means for supplying oil to the tank, means for drawing oil from the tank, and an insulated vent pipe extending from the tank and provided with a valved opening beyond the water.

5. The herein described method of insulating an oil-containing tank against external fire-producing agents, consisting in bodily submerging the tank in a fire-insulating liquid maintained at approximately a normal level above the tank, guarding the sides and bottom of the tank by a medium permeated by said liquid in greater or less degree, and providing the said tank with a vacuum relief member externally insulated from the tank, and fire insulated by said body of liquid above the tank.

In testimony whereof, I affix my signature.

MALCOLM J. MUNN. [L. S.]